July 4, 1939. F. PORSCHE 2,164,838
SPRINGING OF THE WHEELS OF MOTOR VEHICLES
Filed Feb. 16, 1934 2 Sheets-Sheet 1
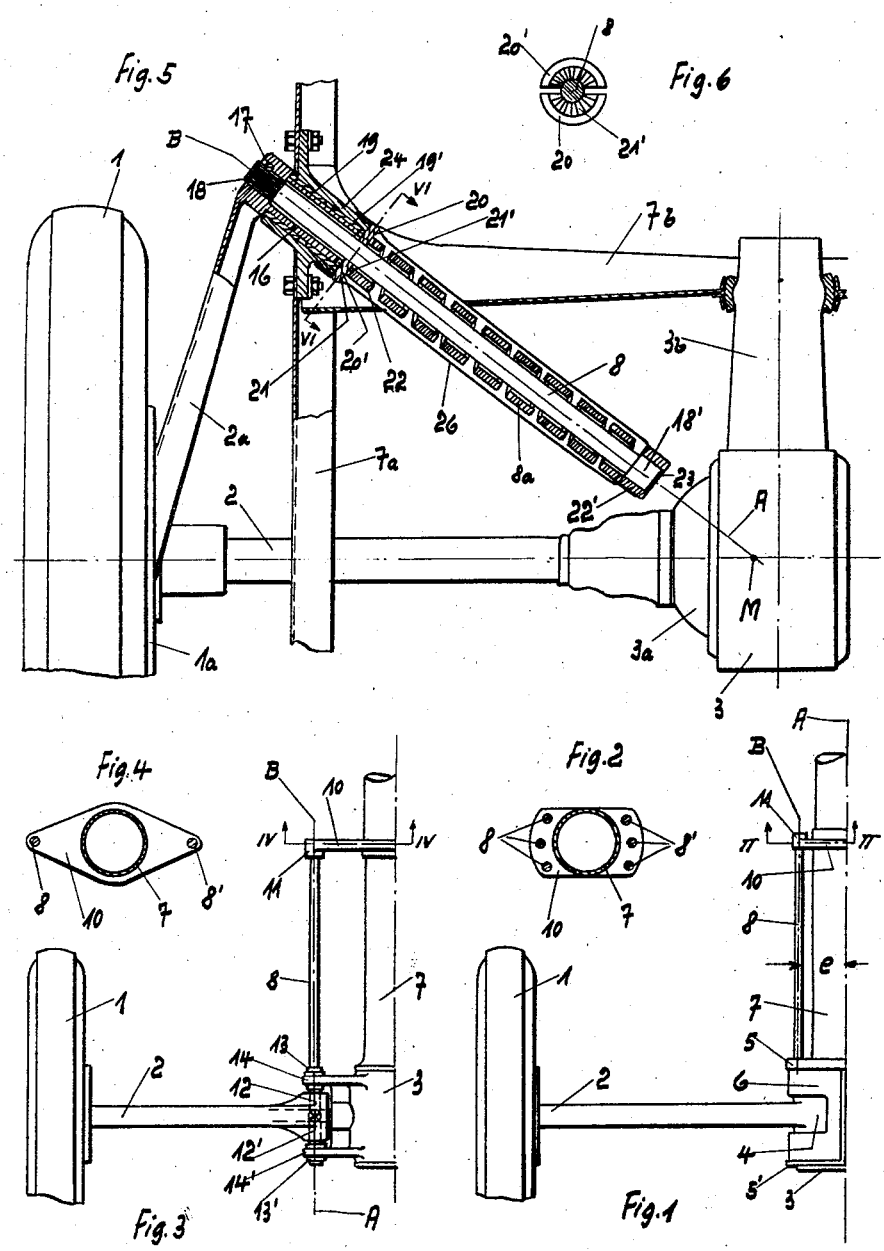
Inventor:
Ferdinand Porsche

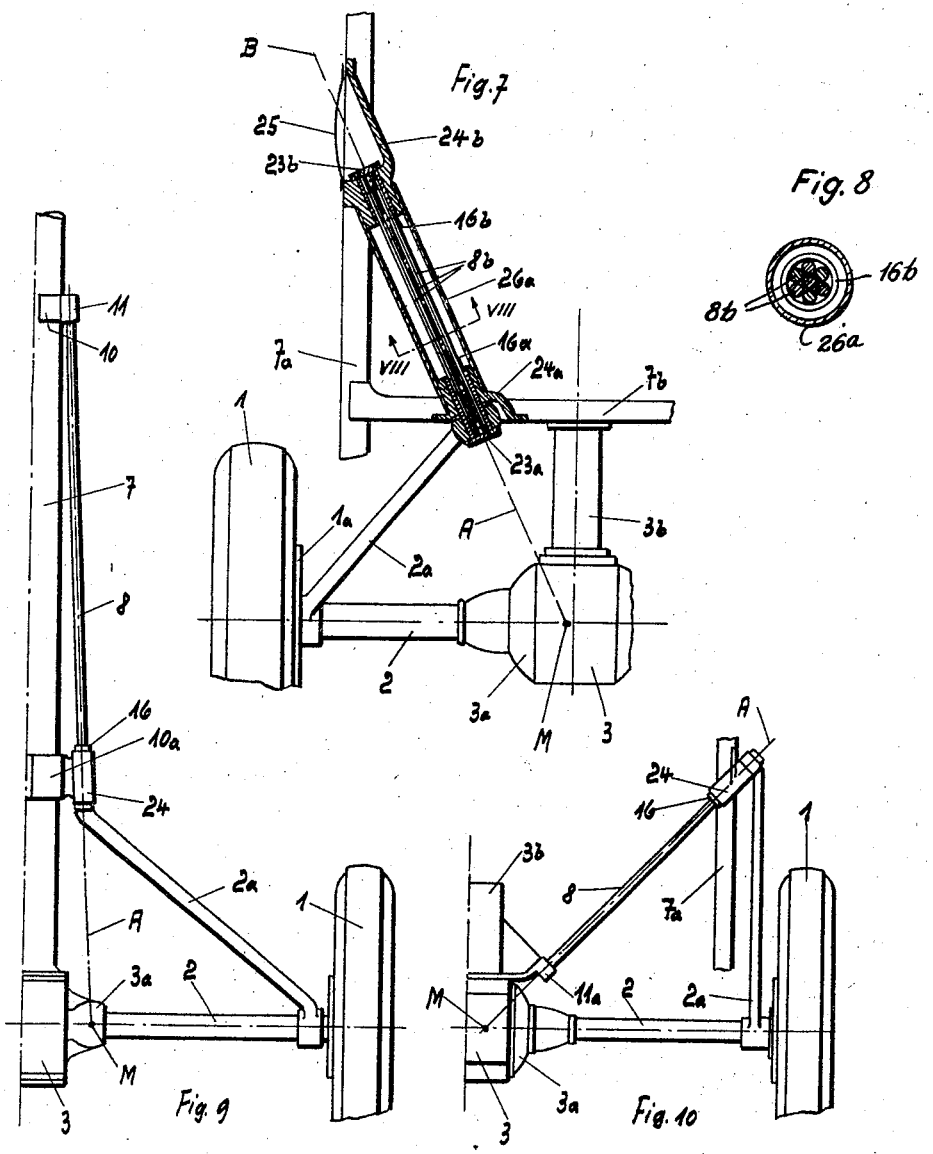

Patented July 4, 1939

2,164,838

UNITED STATES PATENT OFFICE 2,164,838

SPRINGING OF THE WHEELS OF MOTOR VEHICLES

Ferdinand Porsche, Stuttgart, Germany, assignor to Dr. ing. h. c. F. Porsche, K.-G., Stuttgart-Zuffenhausen, Germany, a company of Germany Application February 16, 1934, Serial No 711,575
In Germany February 18, 1933

20 Claims. (Cl. 267—57)

This invention relates to a springing arrangement for wheels mounted on swinging half axles, more particularly for motor vehicles.

The springing of wheels mounted on swinging half axles has hitherto been effected exclusively by means of springs which are deformed by a lifting motion. These include for instance leaf springs which are connected through the intermediary of separate springs suspensions, and helical springs which are connected directly, to the outer end of the axles. As the points where the springs are connected become displaced with respect to the frame owing to the tilting motion of the half axles, it is not possible with such a spring arrangement to obtain a spring action which is proportional to the tilting angle. Such an action is, however, desirable in order to eliminate any change of the specific springing with the positively occurring change in the gauge in the case of wheels guided in such a manner. This is of special importance for the particularly softly sprung rear axles of motor vehicles, which are mounted on swinging half axles for simplifying the drive, in order to eliminate the spreading action with respect to the road surface, produced by the tilting motion of the wheels, and to prevent as far as possible the drive being influenced by the springing. In this spring arrangement the relative displacements of the points of connections of the springs due to the tilting motion of the half axles as a rule release positive forces which must be taken up by the axle tube itself or the mounting of the latter. The reaction forces, however, which are produced by the occurring centrifugal moments are thereby considerably increased and the springing properties are thus further detrimentally affected by the increase in the friction. A further disadvantage of this springing arrangement is that the lifting springs which act at a considerable distance from the theoretical swinging axis of the wheels considerably increase both through their own weight which takes part in the motion and the dead weight of their connecting members, the unsprung masses and consequently the centrifugal moments as well. Furthermore this springing arrangement in some cases occupies a very considerable amount of space in the chassis, which interferes with the space available for other vital parts and greatly limits the proper utilisation of the available space in the vehicle.

The novel feature of the invention consists in effecting the springing by torsion springs lying in or approximately in the theoretical swinging axis of the wheels. These include for instance spring bars and helical springs which are connected to the pivotal joint of the axle tube and are therefore deformed substantially only by a torsional moment. The result of this is that the specific springing with respect to the wheel can be kept practically constant and therefore independent of the variations in gauge produced by the tilting motion of the half axle. As the torsion spring is in this case disposed at as long as possible a lever arm from the wheel, it becomes possible to realise particularly high specific springing actions which are specially necessary for the wheels mounted on swinging half axles, more particularly the rear wheels. As, furthermore, the torsion spring opposes to the motion of the wheel the smallest possible moment of inertia, namely that about the axis of the centre of gravity, it is no longer necessary to provide for any appreciable increase in the unsprung wheel masses and consequently any increase in the gyroscopic moments Such torsion springs can be connected directly in a very simple manner to the bearing pivots of the half axle, which determine the theoretical swinging axis of the wheels, so that separate connecting members and their maintenance can be dispensed with and the reliability of operation of the swinging half axles is thereby considerably increased. Such torsion springs occupy very little space in the chassis, as they can in each case be designed to suit and housed in the available space.

Springing arrangements by means of torsion springs for guiding wheels in many different ways are already known. To these belong the wheels which are mounted on rigid axles, are sprung by means of separate spring link members connected to the torsion springs and are driven by way of an axle bridge of the usual kind. These cases apply to tiltable wheels but not to independently guided wheels, so that the arrangement of the torsion springs secures advantages only from the point of view of springing but not from the point of view of guiding. To this class there belong also the wheels which are mounted independently of one another on pairs of link members or independently of one another on separate link members and which are sprung directly by the guiding members connected to the torsion springs and are driven through double jointed shafts or hub gearing from an axle casing fixed to the chassis. Such wheels are wheels which are guided independently but are not capable of tilting, so that the arrangement of the torsion springs provides conversely only advantages as regards guiding but not as regards the springing.

In contradistinction thereto the arrangement of the torsion springs according to the invention for wheels which are capable of swinging by means of half axles, that is to say wheels which are guided both independently and so as to be capable of tilting, has advantages both as regards guiding and springing, without sacrificing the advantages obtained by decreasing the unsprung masses, the elimination of all weight-increasing connecting members requiring more maintenance, by saving space and the like. In addition to this the springing arrangement according to the invention secures the high specific springing which is so desirable for swinging half axles without any disadvantage as regards position of the vehicle on the road and the drive of the vehicle.

A further feature of the invention consists in the provision of a structure wherein the torsion spring is connected to the bearing pin of the axle strut. This makes it possible in the case of swinging half axles, the axle tube of which is journalled, with the intermediary of a universal or ball and socket joint, directly in the axle casing, to place the point of attachment of the torsion springs which are disposed in or approximately in the theoretical axis of oscillation, outside the axle casing, that is to say at an accessible place. The effective length of arm of the swinging half axles is thereby as a rule shortened, it is true, but the axle tube can be exposed without dismantling the springing arrangement and conversely the springing arrangement without dismantling the axle tube. In addition with this arrangement the torsion spring can be placed towards the middle of the vehicle and consequently a far greater available space obtained in the chassis for it.

It is accordingly an object of this invention to provide a springing arrangement for the wheels of a vehicle which has many advantages over those now known in the art.

A further object of my invention is the provision of springing means for the wheels of a vehicle which are readily accessible for dismantling and repair.

Still another object of my invention is the provision of a springing means for the wheels of a vehicle which can readily be used in conjunction with swinging half-axles where such axles also form the wheel driving means.

A more specific object of my invention is the provision of improved springing means for the wheels of a vehicle which occupy a relatively small space.

Other objects will become apparent from the following description taken in connection with the attached drawings showing several illustrative embodiments of the invention, and wherein:

Fig. 1 is the plan view of the first constructional form for the left-hand side of the vehicle, Fig. 2 the corresponding section along line II—II of Fig. 1, Fig. 3 the plan view of the second constructional form for the left-hand side of the vehicle, Fig. 4 the corresponding section along line IV—IV of Fig. 3, Fig. 5 the plan view of the third constructional form of the left-hand side of the vehicle, partly in horizontal section, Fig. 6 the corresponding section along line VI—VI of Fig. 5, Fig. 7 the plan view of the fourth constructional form of the left-hand side of the vehicle, partly in horizontal section, Fig. 8 the corresponding section along line VIII—VIII of Fig. 7, Fig. 9 the plan view of the fifth constructional form for the right-hand side of the vehicle, and Fig. 10 the plan view of the sixth constructional form for the right-hand side of the vehicle.

In the first constructional form shown in Figs. 1 and 2 the axle tube 2, on which the wheel 1 is mounted, is guided by a cylindrical bushing 4 so as to be capable of turning with respect to the axle casing 3. The cylindrical bushing 4 is preferably secured by a cover 6 between its lateral collars 5, 5' on the axle casing 3. The axle casing 3 is connected directly to the end of a tubular longitudinal central member 7 which may be a part of or directly connected to the vehicle frame. To the forward collar 5 of the cylindrical bushing 4 a plurality of spring bars 8 are fixed, which extend parallel to the longitudinal central member 7 towards the middle of the vehicle. While three spring bars are here shown, it will be obvious to one skilled in the art that the number may be varied. The forward ends of the bars 8 are held by suitable means as in eyes 11 of a transverse supporting member 10 which is connected to the longitudinal central member 7. Assuming, for example, that the longitudinal central axis of the vehicle represents the theoretical axis of oscillation A of the wheel 1, the axis of rotation B of the spring bars 8 is displaced by the amount e parallel to the former. On the wheel 1 swinging the spring bars 8 are all deformed to the same extent, being stressed in torsion, and owing to the eccentricity e bending as well.

In the second constructional example shown in Figs. 3 and 4 the axle tube 2 is guided by two cylindrical pins 13 and 13' so as to rotate with respect to the axle casing 3. For this purpose the inner end of the axle tube 2 is provided with lateral eyes 12, 12' in which the pins 13, 13' are rigidly inserted. The pins 13, 13' are journalled in the eyes 14, 14' of a supporting bracket connected to the axle casing 3. To the forward bearing pin 13 a spring bar 8 is directly connected, which is disposed coaxially with the bearing pin 13 and parallel with the longitudinal central member 7. The forward end of the spring bar 8 is held in the eye 11 of a transverse supporting member 10 which is connected to the longitudinal central member 7. The theoretical axis of oscillation A of the wheel 1 and the axis of rotation B of the spring bar 8 coincide with one another. On the wheel 1 swinging, the spring bar 8 is stressed in torsion proportionally to the angle of tilt of the wheel 1. The bearing pins 13, 13' are disposed at such a distance from one another that there is room for the universal joint between the shaft guided in the axle tube 2 and the connecting shaft for the drive of the wheel 1, which is guided in the supporting bracket of the axle casing 3.

In the third constructional example according to Figs. 5 and 6 the axle tube 2 is guided in a spherical cup with respect to the axle casing 3 and is secured to the latter by a cover 3a. The axle casing 3 is connected through the tubular extension 3b with the transverse member 7b of the frame, which consists of two parallel longitudinal members 7a. To the brake carrier disc 1a of the wheel 1 there is connected an axle strut 2a which extends obliquely forwards and inwards. The forward end of the axle strut 2a is provided with a bearing journal 16 which is supported by means of the bearing bushes 19, 19' in a bearing casing 24 fixed to the longitudinal member 7a of the frame. The bearing journal 16 of the axle strut 2a is hollow and lengthwise through it extends a spring bar 8 which is coaxial with it. The spring bar 8 is connected to the bearing journal 16 by a fluted part 18 and is secured against longitudinal displacement by a pin 17. The spring bar 8 coacts with a cylindrical helical spring 8a of rectangular cross-section, which surrounds it, and the ends of which 22, 22' are formed into rings closed on themselves. The ends 18', 22' of the springs 8, 8a which extend freely into the interior of the frame 7a, 7b are connected to one another at 23 directly, for instance by welding. The outer end 22 of the helical spring 8a is provided with fluting 21' and is in engagement with a correspondingly fluted two-part locking plate 20, 20'. The end surface of the bearing casing 24 is also provided with flutings 21, in which a further ring of flutings on the locking plate 20, 20' engages. The number of flutings 21, 21' is preferably different in each case, in order that by displacing the plate 20, 20' with respect to the helical spring 8a and the bearing casing 24, the springs 8, 8a may be tightened up when required. The springs 8, 8a are enclosed in a protective casing 26 which is connected to the casing 24. The axis of the bearing journal 16 passes through the centre M of the spherical guiding means in the axle casing 3 and represents the theoretical axis of oscillation A of the wheel. The axis of rotation B of the springs 8, 8a coincides with this axis of oscillation A, so that, on the wheel 1 swinging, the springs 8, 8a become deformed through the rotary motion of the journal 16, the spring bar 2 being stressed in torsion and the helical spring 8a surrounding it being stressed in bending. The torque exerted by the helical spring 8a is first transmitted to the inner end 18' of the spring bar 8 and together with the torque exerted by the latter to the axle strut 2a through the fluted part 18.

In the fourth constructional example according to Figs. 7 and 8 the way in which the wheel is guided corresponds substantially to that of the previous constructional example. The end of the axle strut 2a is, however, placed further inwards into the vicinity of the casing extension 3b, so that the torsion spring can no longer be connected on the axle side but on the frame side with the axle strut 2a. The torsion spring preferably but not necessarily consists of a bundle of spring bars 8b which are held together in star-shaped formation by means of special supporting journals 16a, 16b at their ends. The spring bars 8b extend lengthwise through the hollow supporting journals 16a, 16b and are connected at the ends of the latter at 23a, 23b, in some suitable manner as by welding. The rear supporting journal 16a is rigidly connected to the end of the axle strut 2a and supported so as to be capable of turning in a bearing casing 24a fixed to the transverse member 7b of the frame, while the forward bearing journal 16b is supported in a bearing casing 24b fixed to the longitudinal frame member 7a and rigidly fixed to the same. The two bearing casings 24a, 24b, are connected to one another by a tube 26a, which acts as a corner reinforcement for the frame members 7a, 7b and at the same time as a protective sleeve for the spring bars 8b. The torsion spring can be removed through a lateral opening in the longitudinal frame member 7, which is closed by means of a cover 25, for being readjusted. The axis B of this torsion spring again coincides exactly with the theoretical axis of oscillation A of the wheel 1, so that on the latter swinging all the spring bars 8b are distorted by the supporting journal 16a. The spring bars 8b are thus stressed in torsion and the outer spring bars, owing to their eccentricity with respect to the axis of rotation B, in bending as well.

In the fifth constructional example according to Fig. 9 the axle tube 2 is guided by a ball joint with respect to the axle casing 3, the centre point M of which in contradistinction to the examples shown in Figs. 5 and 7 is supported outside the axle casing 3 in a special supporting bracket. The axle strut 2a which is connected to the axle tube 2 is supported very far inwards, on the longitudinal central member 7 which may be part of the vehicle frame. The bearing journal 16 of the axle strut 2a is supported in a bearing casing 24 which together with that lying opposite it is fixed by suitable means, such as the shackle 10a on the longitudinal central member 7. The spring bar 8 which is attached coaxially to the said bearing journal 16 is disposed at a slight inclination to the longitudinal central member 7 towards the centre of the vehicle. Its abutment 11 is fixed together with that of the oppositely disposed spring bar by means shown as a shackle 10 to the longitudinal central member 7. Owing to the slight inclination of the axis of rotation of the spring bar 8 with respect to the longitudinal axis of the frame, the spring bar 8 lies exactly in the theoretical axis of oscillation A of the wheel 1 and can therefore be stressed only purely in torsion.

In the sixth constructional example according to Fig. 10 the axle tube 2 is guided by means of a ball and socket joint with respect to the axle casing 3. The axle strut 2a connected to the axle tube 2 is displaced forwardly approximately parallel to the longitudinal frame member 7a. The spring bar 8 which is disposed on the axle side is connected at one end to the bearing journal 16 of the axle strut 2a and at the other end to a suitably reinforced eye 11a of the tube extension 3b. The position of the eye 11a on the tube extension 3b is selected in such a manner that the bearing cover 3a can be removed without obstruction. The spring bar 8 lies in the theoretical axis of oscillation A of the wheel 1 and represents as it were the shortest connection between the bearing journal 16 and the axle casing 3. The spring reaction moments exerted on the axle casing 3 balance one another in equidirected lifting motions of the wheels without reaching the frame.

The various possible ways of arranging the springing are not exhausted by these constructional examples. Depending upon the kind of construction of the frame and of the swinging half axle adopted, the torsion springs can in each case be so arranged in the un-utilized space of the frame that no special space need be provided for them. The torsion springs may be protected in a very convenient way by the frame itself or by suitable reinforcing members from damage through impact, flying stones, or the like. Through the direct connection of the spring ends with the axle parts on the one hand and the frame parts on the other hand, it is possible to do without additional connecting members in most cases. The connection itself is best effected by means of directly tooled-in flutings, which can be made at very low cost and at the same time enable the springs to be readjusted by shifting the flutings. Should a finer adjustment of the torsion springs than is allowed for by the number of flutings which is limited from constructional reasons be required, it will be of advantage to introduce intermediate members fluted on either side, in the manner of the locking plate 20, 20′ (Figs. 5 and 6) which, through a simultaneous displacement of the rings of flutings which are made with a different pitch, enable very small changes in the spring tension to be made. A respringing of the torsion springs is in this case unnecessary. As torsion springs there may be used either single springs, that is to say bar springs, helical springs, spiral springs or the like, or composite springs which are disposed either in series (Fig. 5) or in parallel (Fig. 7). The connecting members of the individual springs may then serve at the same time for guiding them in the frame or as bearing journals for the axle parts (Fig. 7). The advantages of the invention are available in the same way for all torsion springs which lie even only approximately in the theoretical axis of oscillation of the wheels.

The word "frame" as herein used is not to be understood as limited to such devices when forming a part of or intimately interconnected with said body or coachwork of the vehicle.

It will be seen that I have provided a construction which satisfies the objects enumerated above and while I have shown the invention in certain physical embodiments, it is to be understood that modifications of the structure shown may be made by those skilled in this art without departing from my invention as expressed in the claims which follow:

What I claim is:

1. In a vehicle having a chassis, an axle having a wheel co-axially mounted thereon, means for pivotally connecting said axle to said chassis to provide for swinging of said axle relative to the chassis about a substantially horizontal axis, and a torsion spring connected to said chassis and said axle comprising a flexible rod positioned substantially in said axis to resist swinging of said axle relative to said chassis.

2. In a vehicle having a chassis, an axle having a wheel co-axially mounted thereon, means for pivotally connecting said axle to said chassis to provide for swinging of said axle relative to the chassis about a substantially horizontal axis, and a torsion spring connected to said chassis and said axle comprising a bundle of flexible rods positioned substantially in said axis to resist swinging of said axle relative to said chassis.

3. In a vehicle having a chassis including a frame and a drive shaft housing, a swinging half axle, means for pivotally connecting said axle to said drive shaft housing to provide for swinging of said axle relative to the drive shaft housing about a substantially horizontal axis, and a torsion spring connected to said chassis and said axle positioned substantially in said axis to resist swinging of the axle relative to said frame.

4. In a vehicle having a chassis including a frame and a drive shaft housing rigidly connected thereto, a wheel axle, means mounted on said chassis for supporting a substantially horizontally disposed torsion spring, and means in alignment with said torsion spring for pivotally connecting one end of said axle to said drive shaft housing to provide for swinging about an axis in alignment with said spring, means for rigidly connecting one end of said spring to said chassis, and means for rigidly connecting the other end of said spring to said axle.

5. In a vehicle having a chassis including a frame and a drive shaft housing rigidly connected thereto, a wheel axle, means for pivotally connecting said axle to said housing, a strut attached to said axle, means for pivotally attaching the free end of said strut to said frame whereby said wheel axle is confined to pivotal movement relative to the frame and drive shaft housing about a substantially horizontal axis, and means connected to said frame and said strut positioned substantially in alignment with said axis for torsionally resisting movement of said axle about said axis.

6. In a vehicle having a chassis including a frame and a drive shaft housing rigidly connected thereto, a wheel axle, means for pivotally connecting said axle to said housing, a strut attached to said axle, means on said frame for rotatably supporting a journal for movment about a substantially horizontal axis in alignment with the pivotal connection between said axle and housing, said journal being connected to the free end of said strut for limiting the movement of said axle about said axis, and a torsion spring connected to said frame and said strut mounted in alignment with said axis for resisting movement between said journal and its support carried by the frame.

7. In a vehicle having a chassis including a frame and a drive shaft housing, a wheel axle, means for pivotally connecting said axle to said drive shaft housing, a strut having one end fixed to the wheel-carrying end of said axle and the other end connected to a substantially horizontally positioned shaft rotatably mounted on the frame at a point horizontally spaced from the point of attachment of said axle, whereby said axle is limited to swing about an axis passing through the point of attachment of the axle to the drive shaft housing and the strut-carrying shaft, and a torsion spring fixed between said frame and said strut in alignment with said axis for resisting swinging of said axle relative to said frame.

8. In a vehicle having a chassis including a frame and a drive shaft housing rigidly connected thereto, a wheel axle, means for pivotally connecting said axle to said housing, a strut attached to said axle adjacent the wheel-carrying end, means on said frame for rotatably supporting a journal for movement about a substantially horizontal axis in alignment with the pivotal connection between said axle and housing, said journal being connected to the free end of said strut for limiting the movement of said axle about said axis, and a torsion spring mounted in alignment with said axis for resisting movement between said journal and its support carried by the frame, said spring having one end affixed to said strut and the other end affixed to the chassis.

9. In a vehicle having a chassis including a frame and a drive shaft housing rigidly connected thereto, a wheel axle, means for pivotally connecting said axle to said housing, a strut attached to said axle adjacent the wheel-carrying end, means on said frame for rotatably supporting a journal for movement about a substantially horizontal axis in alignment with the pivotal connection between said axle and housing, said journal being connected to the free end of said strut for limiting the movement of said axle about said axis, and a torsion spring mounted in alignment with said axis for resisting movement between said journal and its support carried by the frame, said spring having one end affixed to said strut and the other end extending toward the point of attachment of said axle to said drive shaft housing and being connected to said frame.

10. In a vehicle having a chassis including a frame and a drive shaft housing rigidly connected thereto, a wheel axle, means for pivotally connecting said axle to said housing, a strut attached to said axle adjacent the wheel-carrying end, means on said frame for rotatably supporting a journal for movement about a substantially horizontal axis in alignment with the pivotal connection between said axle and housing, said journal being connected to the free end of said strut for limiting the movement of said axle about said axis, and a torsion spring mounted in alignment with said axis for resisting movement between said journal and its support carried by the frame, said spring having one end affixed to said strut and the other end extending away from the point of attachment of said axle to said drive shaft housing and being connected to said frame.

11. In a vehicle having a chassis including a frame and a drive shaft housing, a swinging half axle, means for pivotally connecting said axle to said drive shaft housing to provide for the swinging of said axle relative to said drive shaft housing about a substantially horizontal axis, and torsion spring means connected to said frame and said axle positioned substantially in said axis to resist swinging of the axle relative to said frame.

12. In a vehicle having a chassis, an axle having a wheel co-axially mounted thereon, means for pivotally connecting said axle to said chassis to provide for swinging of said axle relative to said chassis about a substantially horizontal axis, and a torsion spring means connected to said chassis and said axle positioned substantially in said axis to resist swinging of said axle relative to said chassis.

13. In a vehicle having a chassis, an axle having a wheel co-axially mounted thereon, means for pivotally connecting said axle to said chassis to provide for swinging of said axle relative to the chassis about a substantially horizontal axis, and a torsion spring connected to said chassis and connected to said axle by means co-axial with said horizontal axis, comprising a flexible rod positioned substantially in said axis to resist swinging of said axle relative to said chassis.

14. A vehicle having a frame, in combination, an axle pivotally connected to said frame, a wheel on said axle, a strut attached at one end to said axle extending substantially parallel to the longitudinal plane of said vehicle and journaled at its other end to the frame for restricting motion of said axle about a substantially horizontal axis, and spring means connecting said strut to said frame for resisting movement of said axle.

15. The combination according to claim 14 in which said spring means is co-axial with said horizontal axis.

16. The combination according to claim 14 in which the primary stress in said spring means is torsion.

17. In a vehicle having a chassis, a wheel axle, means for pivotally connecting said axle to said chassis to provide for swinging of said axle relative to the chassis about a substantially horizontal axis, and a torsion spring positioned substantially in said axis to resist swinging of said axle about said axis, said torsion spring comprising a flexible rod and a helical spring loosely coiled thereabout, one end of said spring being connected to one end of said rod and means connecting the other end of said rod and spring between the chassis and axle to resist swinging of said axle relatively to said chassis.

18. In a vehicle having a chassis including a frame and a drive shaft housing rigidly connected thereto, a wheel axle, means for pivotally connecting said axle to said housing, a strut attached to said axle adjacent the wheel carrying end, means on said frame for rotatably supporting a journal for movement about a substantially horizontal axis in alignment with the pivotal connection between said axle and housing, said journal being connected to the free end of said strut for limiting the movement of said axle about said axis, a flexible rod attached at one end to said journal and extending in alignment with said axis toward the point of attachment of said axle to said drive shaft housing, and a helical spring surrounding said rod and having one end attached to the free end thereof and the other end affixed to said frame.

19. In a vehicle having a chassis including a frame and a drive shaft housing rigidly connected thereto, a wheel axle, means for pivotally connecting said axle to said housing, a strut attached to said axle adjacent the wheel carrying end, means on said frame for rotatably supporting a journal for movement about a substantially horizontal axis in alignment with the pivotal connection between said axle and housing, said journal being connected to the free end of a flexible rod attached at one end to said journal and extending in alignment with said axis toward the point of attachment of said axle to said drive shaft housing, a helical spring surrounding said rod and having one end attached to the free end thereof, and means affixed to the other end of the helical spring for adjustably securing said other end of the spring to the frame thereby varying the effect of said spring.

20. A motor vehicle having a pair of frame members, a pair of road wheels each carried upon a swinging half axle assembly supported upon the frame members, a torsion shaft connected with each half axle assembly to rotate upon swinging movement therof and extending diagonally to the adjacent frame member and connected therewith by suspension means adapted to yieldingly resist rotation of the shaft.

FERDINAND PORSCHE.